May 17, 1966   R. G. OSWALD ET AL   3,251,606
CHUCK
Filed Jan. 20, 1964   2 Sheets-Sheet 1
Fig-1
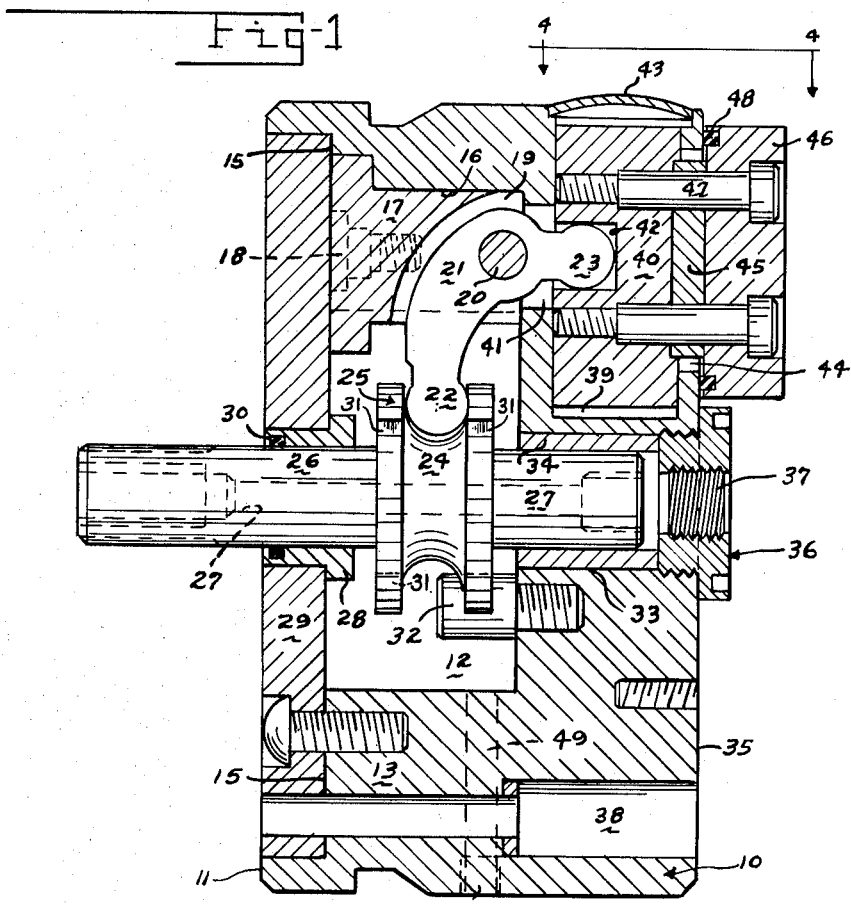
Fig-4
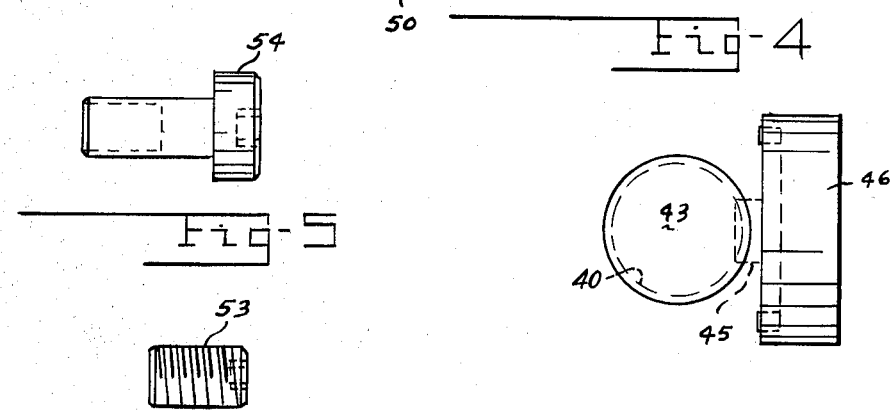
Fig-5
Fig-6
INVENTORS
RICHARD G. OSWALD
DANIEL B. CRANE
BY Tom Walker
Jerome P. Bloom
ATTORNEYS May 17, 1966 R. G. OSWALD ET AL 3,251,606
CHUCK
Filed Jan. 20, 1964 2 Sheets-Sheet 2
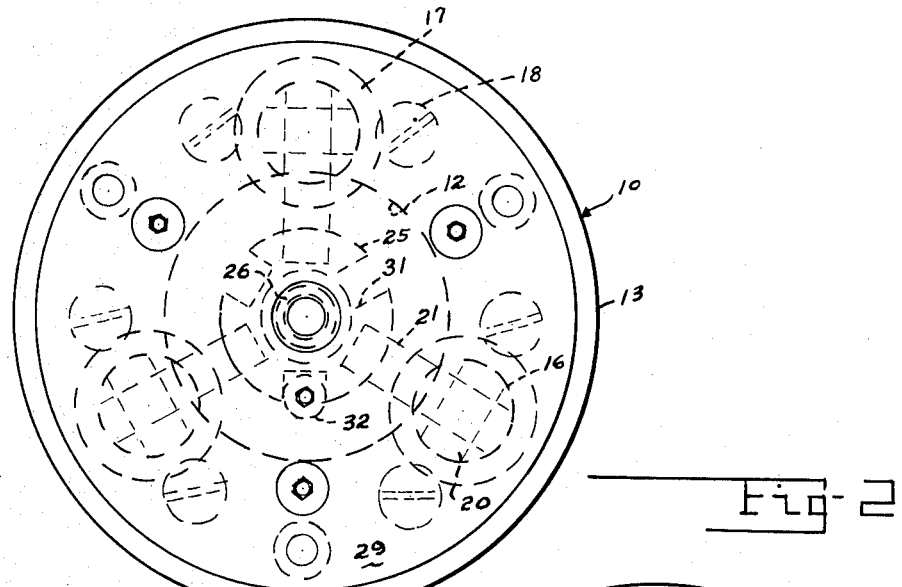
Fig-2
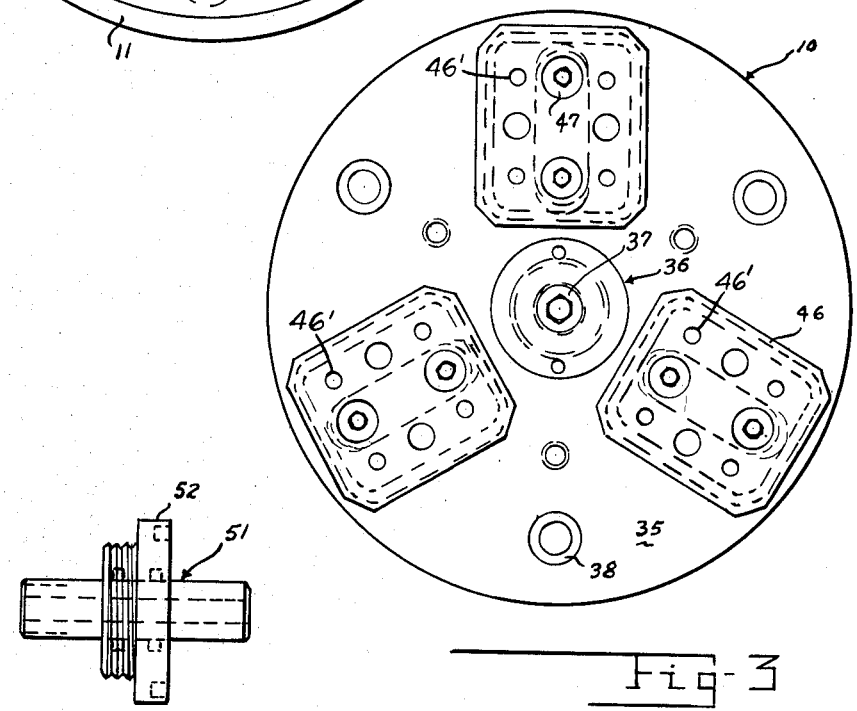
Fig-3
Fig-7
INVENTORS
RICHARD G. OSWALD
DANIEL B. CRANE
BY Tom Walker
Jerome P. Bloom
ATTORNEYS United States Patent Office 3,251,606
Patented May 17, 1966

3,251,606
CHUCK
Richard G. Oswald and Daniel Burton Crane, Dayton, Ohio, assignors to Garrison Machine Works, Inc., Dayton, Ohio, a corporation of Ohio
Filed Jan. 20, 1964, Ser. No. 338,938
5 Claims. (Cl. 279—119)

This invention relates to chucks and more particularly to improvements in precision power chucks. Embodiments are so formed to have a prolonged operating life, to require minimum maintenance and to retain their accuracy over an extended period of time.

A primary object of the invention is to provide a chuck which is economical to fabricate, more efficient and satisfactory in use, adaptable to a wide variety of applications and unlikely to malfunction.

A further object of the invention is to provide a precision power chuck the moving parts of which are effectively sealed against the entrance of foreign matter which would normally affect their operating life.

Another object of the invention is to provide a draw bar operated chuck so formed to enable the removal or installation of its draw bar without a complete disassembly of the chuck parts.

An additional object of the invention is to provide a precision power chuck incorporating improved means for controlling the adjustment of the chuck jaws.

A further object of the invention is to provide improvements in draw bars facilitating their use in application to draw bar operated chucks.

Another object of the invention is to provide means enabling a more uniform control of chuck jaws.

An additional object of the invention is to provide a precision power chuck possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a cross-sectional view of a basic chuck in accordance with the present invention;

FIG. 2 is a view of one end thereof;

FIG. 3 is a view of its other end;

FIG. 4 is a fragmentary detail view of the chuck structure visible on line 4—4 of FIG. 1; and FIGS. 5 through 7 are detail views of elements used in conjunction with the chuck of FIG. 1.

Like parts are indicated by similar characters of reference throughout the several views.

The chuck assembly as shown in the drawings comprises a body 10 of generally cylindrical form having to one end a face 11 including a central, cylindrically contoured recess 12. The recess 12 is defined by a body section 13 which has a generally tubular form. The body section 13 is countersunk at the outer end of the recess 12 to thereby provide a relatively broad annular shoulder 15 spaced in adjacent parallel relation to the face 11. The shoulder 15 has a series of three circularly arranged, equidistantly spaced recesses 16. Each of the recesses 16 accommodates a post 17 the outermost surface of which is co-planar with the shoulder 15 and fixed thereto at peripheral edge portions by diametrally opposite lock screws 18.

Each post 17 includes to its inner end a bifurcated extremity 19 which seats to the base of the recess 12. The bifurcated extremity 19 is transversely bridged by a pin 20. Within the bifurcation the pin 20 pivotally mounts an arcuately formed actuator arm 21.

Each actuator arm 21 has its respective extremities 22 and 23 formed to a knob-like configuration. The knob-like extremities 22 have a generally common orientation, projecting inwardly of the recess 12 to nest in the peripheral cavity 24 formed circumferentially of a bell-like expansion 25 and a draw bar 26. Draw bar 26 has a tubular form, including a through passage 27 for purposes to be further described.

The one end of the draw bar 26 projects outwardly of the recess 12 through a hardened tubular bushing 28 nesting in a central aperture formed in a back plate 29 which serves as a cover for the recess 12. The plate 29 seals the recess 12 by having the outer peripheral portions thereof abut the shoulder 15, co-extensive therewith. The central aperture in the plate 29 also accommodates a seal 30 which seats in the outermost end thereof in end abutting relation to the bushing 28. Thus, the one end of the draw bar has a seal formed thereabout as it projects from the recess 12 to connect to a powered operating member, not shown.

Referring to FIGURE 2 of the drawings, it may be seen that the bell-like expansion 25 on the draw bar 26 includes three peripheral notches 31 which are equidistantly spaced. Fixed to project from the base of the recess 12 in the body 10 is a locating stud 32, the head of which is arranged to project in one of the notches 31. The stud 32 thereby provides for a predetermined non-rotative alignment of the draw bar 26 in reference to its movements to and from the chuck body 10.

At the base of the recess 12 the body 10 has a central through aperture 33 arranged to be coaxial with the through aperture accommodating the bushing 28 in the back plate 29. Aperture 33 is lined by a hardened metallic bushing 34 which bearingly accommodates the innermost or forward extremity of the draw bar 26. Bushing 34 terminates short of the chuck operating face 35 which is remote from and parallel to the chuck face 11.

As seen in FIGURE 1 of the drawings, seated in the outer end of aperture 33 adjacent the operating face 35 in threaded engagement to the body 10 is the body of a tubular boss 36. The innermost end of boss 36 abuts the outermost end of the sleeve 34 while its outermost end is expanded to provide a flange which abuts the operating face 35. Boss 36 is sealed by threadedly engaged plug 37.

The body 10 incorporates through apertures 38 which extend from the operating face 35 to its opposite face 11. These apertures accommodate mounting bolts by means of which the chuck body may be fixed to any desired structure its application requires.

In the periphery thereof, adjacent the face 35, body 10 includes there equidistantly spaced, radially oriented recesses 39. Each recess 39 accommodates a generally cylindrical rod element 40 which provides an actuator key. An opening 41 is provided in the base of the recess 12 opposite the bifurcated extremity of each post 17 to provide for communication thereof with a recess 39. Each lateral opening 41 is so formed to accommodate the free projection therethrough of the knob-like extremity 23 of the arm 21 which pivotally mounts on the adjacent post 17. The knob 23 projects to nest in a recess 42 formed in one side of the rod 40 in the adjacent recess 39.

The longitudinal dimension of each of the key elements 40 is less than the depth of the recess 39 in which it nests. The outer extremity of each of the radially oriented recesses 39 is sealed by a freeze-out plug 43, the effect of which is to provide a hermetic seal of each recess 39 at the outer surface of the body 10.

At its face 35 the body 10 has three equidistant circularly spaced openings 44 each of which provides an opening to a recess 39 exposing a substantial surface portion of a key 40. The surface portion of each key 40 directly opposite an opening 44 has a generally rectangular recess accommodating the inner portion of a spacer plate 45. The plate 45 has a depth to position its outer face in a plane immediately adjacent and in a plane parallel to the operating face 35. Fixed on the outer surface of each of the spacer plates 45 is a master jaw 46 having a generally rectangular block form.

As seen in the drawings, each of the jaws 46 is fixed to a respectively associated actuator key 40 through the medium of screws 47. Further, the jaw elements 46 each have their innermost surface most adjacent the chuck face 35 slightly spaced therefrom to avoid a binding thereon. Included in the innermost surface of each of the jaws 46 adjacent the face 35 is a rectangular recess accommodating a seal 48 which rims the adjacent opening 44. Thus the seals 48 thereby provide a seal of the operating face 35.

Each of the master jaws 46 include threaded apertures 46' (FIG. 3) by means of which further chuck jaws may be attached such as suit the particular application.

Noting FIGURE 1 of the drawings, it may be seen that the tubular body portion 13 has a radial aperture providing an inlet 49 for introduction of hydraulic fluid to the recess 12. The inlet 48 is appropriately sealed by a plug 50.

The chuck assembly as above described affords a highly economical drawbar operated chuck. Its drawbar 26 is adapted to reciprocate in the relatively sealed recess 12 moving its bell portion 25 between the back plate 29 and the recess base, in the process of which bar 26 bears simultaneously in bushings 28 and 34. Due to the smooth interconnection of the bell portion 25 with the knob portions 22 to one end of the actuator arms 21 on movement of the drawbar in one direction this action will be smoothly transmitted through knobs 23 to keys 40 and the master jaws 46. Arms 21 serve as lever means, causing jaws 46 to move inwardly towards the center of the operating face 35. On movement of bar 26 in the opposite direction the master jaws will be moved in a sense radially outward of the operating face 35.

By utilizing actuator keys 40 which have a generally cylindrical form, one more effectively precludes the entrance to recesses 39 of foreign matter such as grit which may attempt to pass from the interior of the recess 12, or for that matter, through the openings 44. Freezeout plugs 40 provide supplemental insurance against entry of foreign matter.

Noting the fact that the spacer plates 45 maintain the master jaws 46 slightly outward of the operating face 35, the application of the rectangular seals 48 to project from the master jaws to the operating face 35 about the openings 44 not only enables an additional seal of the openings 44 but provides means whereby a binding of the master jaws on the operating face 35 may be precluded.

The drawbar 26 is tubular to facilitate, where desirable, the flow of a coolant through the center of the chuck body 10. In such event, plug elements 36 and 37 are removed. Noting FIG. 7, the tube 51 is inserted to have its threaded extremity engage in the end of the drawbar 26 adjacent the operating face 35. The nut 52 on the tube 51 is threadedly engaged in the operating face 35 in lieu of the boss 36. Nut 52 has inner seals and is so arranged to provide a bearing containment of the tube 51 providing for its reciprocating action with the drawbar 26. Thus, the tube 51 may be utilized where it is desired to have a through flow of coolant to the exterior of the operating face 35 of the chuck body 10.

In the event chuck jaws are required to be ground on their outer diameters, the plug 37 is first removed from the boss 36. Following this, adjusting screw 53 (FIG. 6) is threaded through the boss 36 to relatively project in the path of the draw bar 26 to thereby limit and control its forward movement in a manner believed obvious. Dependent on the relative projection of the adjusting screw 53 in respect to the drawbar 26, one may limit the forward travel of the drawbar and at the same time establish the jaws 46 in the precise position required for grinding the jaws on their outer diameter.

To grind the jaws 46 on their inner diameter, it is necescesary that the plug 37 be removed from the structure as shown in FIG. 1 of the drawings, following which, the adjusting screw 54 of FIG. 5 may be inserted through the boss 36 to have its threaded extremity engage in the adjacent end of the drawbar 26. This disposes the expanded head of the element 54 exteriorly of the boss 36 at the operating face 35. This expanded head portion of the element 54 serves to limit the retraction of the drawbar 26 and thereby establish a position for the jaws 46 as precisely required to grind their inner diameter.

Thus, the invention provides an extremely versatile standard type chuck, including pads 46 which accommodate any variety of jaws to suit an intended application. A most effective seal is provided in reference to the recess 12 which inhibits the incidence of wear which would normally diminish chuck operating life. Moreover, the nature and arrangement of the moving parts which control the chuck jaws are such that if any wear occurs it is generally uniform and enables the jaws to continue to operate in a most precise fashion. The utilization of the simple guide 32 in conjunction with the particularly formed control portion of the drawbar insures precise and accurate movements thereof and thereby of the master jaws through the medium of the arcuate actuator arms 21. Note that bearing containment of the actuator arms in reference to the drawbar and the use of cylindrical rods which fill the radial recesses in the chuck body insures a smooth and practically effortless movement of the chuck jaws in their operation. Thus, there is a smooth and positive control which precludes malfunction.

As described previously, the simple structure which is afforded by the chuck assembly is evidenced by the notched bell portion 25 on the drawbar 26. On relative rotation of the bar 26, subsequent to the removal of the back plate 29, and retraction of the drawbar, the drawbar is easily and simply cleared in reference to the arm members 21. Thus, the drawbar may be readily removed without need for further disassembly of chuck components.

Accordingly, the chuck assembly above described is simple to fabricate, easy to assemble and requires minimum maintenance procedure over the extended period of its operating life.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A chuck assembly including a chuck body having a recess, a plate means sealing said recess, a draw bar projected through and bearing in said plate means, bridging said recess, and further bearing in said body, integrated means defining an expanded portion of said draw bar within said recess and including an arcuately recessed peripheral bearing portion, said body having passages radial to said draw bar opening laterally in one direction to said recess and in an opposite direction from a face of said body, a reciprocable element bearingly contained in each of said passages to normally seal its said lateral openings, lever means pivoted in said recess, each bearing at one end in said arcuately recessed portion of said draw bar and at its other end projecting through a lateral opening to one of said passages to bearingly engage the contained reciprocable element, chuck jaws positioned in outwardly spaced relation to said body each in connected relation to a respective one of said reciprocable elements through one of said lateral openings and means interposed between each of said jaws and said body to form a seal about each of the superposed lateral openings.

2. A chuck assembly including a chuck body having a recess, releasable plate means sealing said recess, a draw bar projected through and bearing in said plate means to have a portion within said recess, means defining an expanded control portion of said draw bar positioning within said recess, said control portion having a recessed peripheral bearing surface, chuck jaws positioned at a face of said chuck body remote from said releasable plate means, a plurality of lever means each including a portion pivoted in said recess and respectively interconnected with one of said chuck jaws and having an element thereof bearingly contained in the recessed bearing surface of said draw bar, reciprocation of said draw bar producing a corresponding adjustment of said chuck jaws adjacent said face of said body, said control portion of said draw bar being provided with a plurality of radial notches which on rotation of said draw bar provide clearance from said draw bar of the bearingly contained elements of said lever means, enabling thereby a ready removal of said draw bar without need for disturbance of any portion of said control means or chuck jaws.

3. A chuck assembly including a chuck body having a recess, releasable plate means sealing said recess, a draw bar projected through and bearing in said plate means to have a control portion thereof disposed in said recess, said control portion being constituted by a bell-like expansion of said draw bar which in a longitudinal sense affords an arcuately recessed bearing surface, a plurality of actuator arms each having a portion pivoted in said recess and disposing in a radial plane, each control plate having a knob-like projection bearing in the arcuately recessed bearing portion of said bell-like expansion of said draw bar, a plurality of chuck jaws positioned outwardly of a face of said body remote from said releasable plate means, each of said chuck jaws having means defining a bearing interconnection thereof with a portion of one of said actuator arms, said bell-like expansion of said draw bar including radially disposed notches, at least one for each of said actuator arms, facilitating thereby the assembly and disassembly of said draw bar in reference to said actuator arms without disturbing them or the interconnected chuck jaws.

4. A chuck assembly including a chuck body having a recess, releasable plate means sealing said recess, a draw bar projected through and bearing in said plate means to position a control portion thereof in said recess, said control portion offering a radially expanded portion of said draw bar and defining, in a longitudinal sense, an arcuately formed control portion, a plurality of actuator arms pivoted in said recess, said actuator arms being circularly spaced and disposed in radial planes referenced to said draw bar, said actuator arms having portions bearingly related to the control portion of said draw bar, said body having passages radial to said draw bar opening laterally in one direction to said recess and in an opposite direction from a face of said body remote from said releasable plate means, a rod element bearingly contained in each of said passages to normally seal said lateral openings, a spacer element interconnected with each of said rod elements to project through a lateral opening and outwardly of said one face of said chuck body, a chuck jaw mounted by each of said spacer elements outwardly of said one face of said chuck body and sealing means interposed between each chuck jaw and said one face of said chuck body in peripheral confining relation to the underlying lateral openings.

5. A chuck including a chuck body unit, said body unit having a recess, a reciprocable draw bar in said body unit having a circumferentially grooved portion received in said recess, chuck jaws at one end of said body unit, circumferentially spaced apart actuator arms pivotally mounted in said body unit to interconnect said draw bar and said jaws, each of said arms having a knob-like projection received in said grooved portion of said portion of said draw bar, said draw bar having a circumferentially spaced apart series of notches extending longitudinally thereof and opening into said grooved portion, said draw bar being rotatably adjustable to align said notches with said knob-like projections on said actuator arms whereby said draw bar may be disengaged from said actuator arms by an axial withdrawing motion of said bar from said body unit, and releasable means for locking said draw bar in a rotative position misaligning said notches relative to said projections.

References Cited by the Examiner

UNITED STATES PATENTS

| | | | |
|---|---|---|---|
| 2,224,639 | 12/1940 | Ward | 279—119 |
| 2,524,485 | 10/1950 | Sloan | 279—119 |
| 2,695,176 | 11/1954 | Work | 279—119 |
| 3,128,482 | 4/1964 | McConnell | 279—4 |

LESTER M. SWINGLE, *Primary Examiner.*

ROBERT C. RIORDON, *Examiner.*

H. V. STAHLHUTH, *Assistant Examiner.*